April 25, 1933.  S. B. BLAKELY  1,905,890
COLLAPSIBLE LUGGAGE CARRIER
Filed Dec. 23, 1929  3 Sheets-Sheet 1

Inventor
SIDNEY B. BLAKELY
By Paul, Paul Moore
Attorneys

April 25, 1933. S. B. BLAKELY 1,905,890
COLLAPSIBLE LUGGAGE CARRIER
Filed Dec. 23, 1929 3 Sheets-Sheet 2

Inventor
SIDNEY B. BLAKELY
By Paul, Paul & Moore
Attorneys

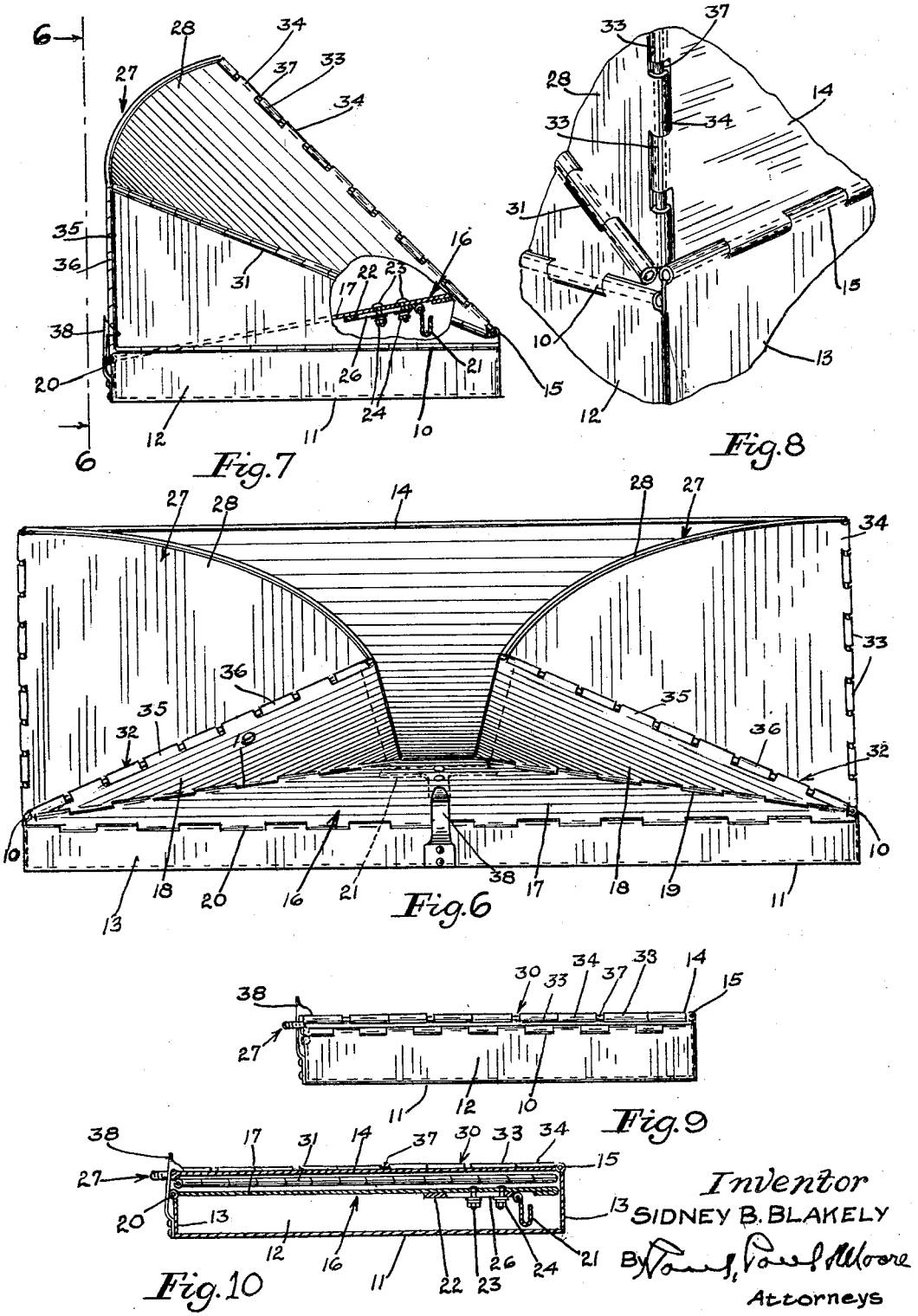

Patented Apr. 25, 1933

1,905,890

UNITED STATES PATENT OFFICE

SIDNEY B. BLAKELY, OF MINNEAPOLIS, MINNESOTA, ASSIGNOR TO MITCHELL BATTERY COMPANY, A CORPORATION OF MINNESOTA

COLLAPSIBLE LUGGAGE CARRIER

Application filed December 23, 1929. Serial No. 415,993.

This invention relates to a collapsible luggage carrier or baggage holder adapted to be mounted on an automobile as, for example, upon the usual trunk rack now provided on many makes of automobiles.

An object of the invention is to provide a collapsible luggage carrier including a plurality of walls adapted to fold inwardly, one over the other in substantially parallel relation, whereby the carrier when folded, will require a comparatively small space for storage.

A further object is to provide a luggage carrier including a pair of oppositely disposed walls adapted to fold inwardly, one over the other, and one of said walls comprising an intermediate section and two end sections, the latter being hinged to said intermediate section, and adapted to fold thereover, when said walls are folded, and the carrier also including side walls hinged to said oppositely disposed walls and each comprising two sections hinged together on a line diagonally thereof, whereby said side walls may be folded inwardly upon themselves when the carrier is collapsed.

A further object is to provide a collapsible luggage carrier including a bottom having front and rear walls hinged thereto and adapted to fold inwardly, one upon the other, and one of said walls comprising an intermediate section and two end sections, said intermediate section having its opposite edges inclined inwardly and in a direction towards the top edge thereof and having the end sections hinged to said inclined edges, whereby said end sections may fold over and against said intermediate section, when the carrier is collapsed, and the carrier also comprising sectional side walls having their lower portions hinged to the bottom and their opposite edges to the ends of the front and rear walls, and said side walls being adapted to fold inwardly to positions between said front and rear walls.

A further object is to provide a collapsible luggage carrier comprising a bottom member having a plurality of walls hinged thereto and to one another and adapted to be unfolded to operative positions to provide a box-like carrier, and means being provided whereby said walls may be folded inwardly over the bottom member and upon one another in substantially parallel relation whereby the overall dimensions of the carrier, when in folded inoperative position, is minimized.

A further object is to provide a collapsible luggage carrier comprising a bottom member having upright fixed wall portions secured thereto, a wall hinged to each of said wall portions and adapted to fold inwardly over said bottom member, said hinged walls also being hinged to one another at the corners of the carrier, and three of the walls being divided into sections having angularly disposed hinges, whereby each of said walls may fold upon itself when the carrier is collapsed, and the horizontally disposed hinges connecting said foldable walls to said upright fixed wall portions being located on different planes so as to cause the walls when folded to lie in parallel relation with respect to one another.

A further object is to provide a collapsible luggage carrier comprising a bottom member and four foldable walls suitably hinged together to permit said walls to be folded inwardly over the bottom member, one of said walls comprising three hinged-together sections and two of the walls each comprising two hinged-together sections, and the sectional construction of said walls causing them to fold upon themselves, when the carrier is collapsed, whereby the height of the carrier walls may correspond substantially to the short horizontal dimension of the carrier, thereby providing a luggage carrier of the character described whose cross-section is substantially square, when the carrier walls are in unfolded operative positions.

Other objects of the invention will appear from the following description and accompanying drawings and will be pointed out in the annexed claims.

Features of the invention reside in the manner in which the walls are hinged to the bottom and in the diagonal hinges provided in the side walls and also in the front wall of the carrier whereby said walls may be folded inwardly over the bottom to positions where they will be concealed by the rear wall of the carrier, when the latter is collapsed; in the construction of the corner hinges of the box which permit relative sliding movement of said walls at their corner hinges when the carrier is folded and unfolded; and in the general construction of the carrier as a whole which is such that the walls thereof may be folded inwardly against the bottom of the carrier and in parallel relation whereby the folded box will require a comparatively small space for storage when not in use.

In the accompanying drawings, there has been disclosed a structure designed to carry out the various objects of the invention, but it is to be understood that the invention is not confined to the exact features shown as various changes may be made within the scope of the claims which follow.

In the drawings:

Figure 6 is a view showing the carrier walls partially folded;

Figure 7 is an end view of Figure 6;

Figure 8 is a perspective view showing the construction of the hinges at the corners of the carrier;

Figure 9 is an end view of the carrier when collapsed; and

Figure 10 is a cross-sectional view of the carrier when collapsed as shown in Figure 9.

Figure 1:
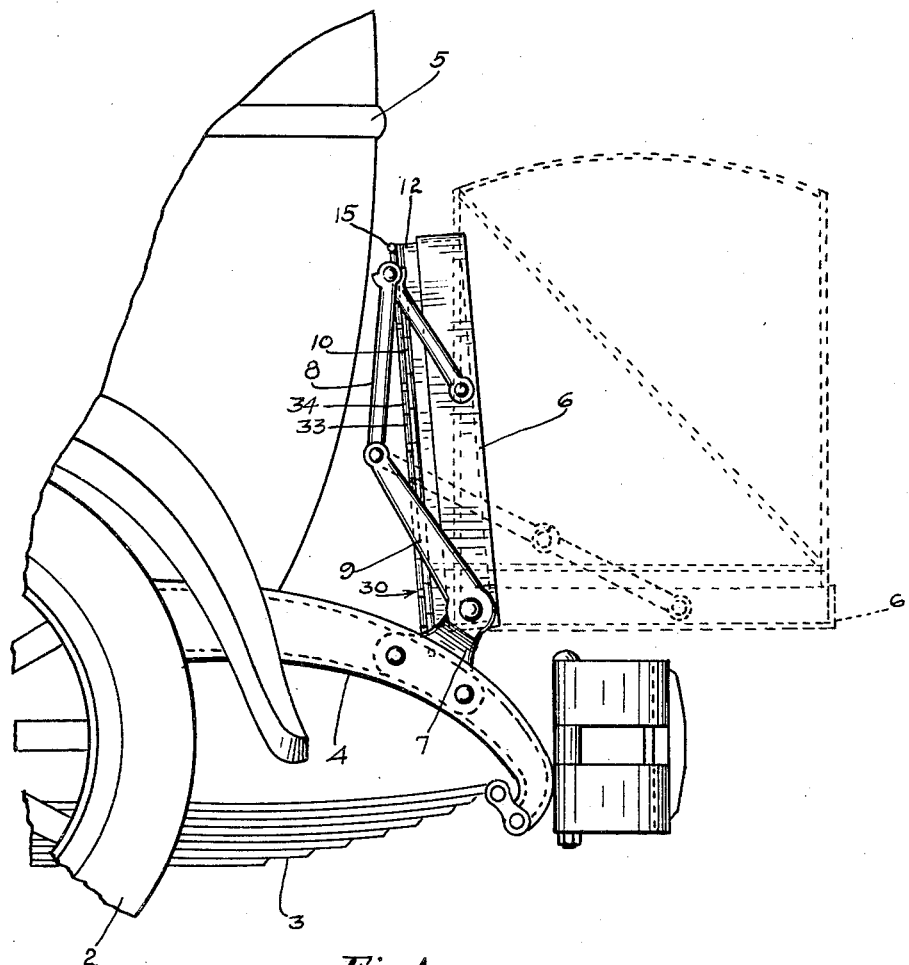
Figure 1 is a view illustrating the rear portion of an automobile provided with a conventional type of trunk rack and showing in dotted lines, the position assumed by my improved luggage carrier when in unfolded operative position, the full lines showing the position of the carrier when folded and not in use.
Figure 2:
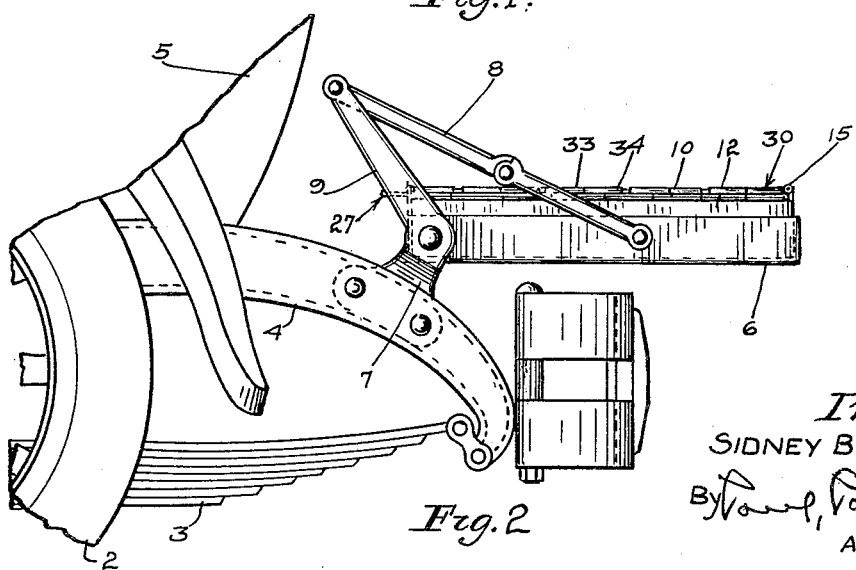
Figure 2 is a view similar to Figure 1 but showing the trunk rack extended and the luggage carrier positioned thereon and in folded position.

In the selected embodiment of the invention here shown, there is illustrated in Figures 1 and 2, a portion of an automobile comprising the usual wheels 2, springs 3, chassis 4, and body 5. The usual trunk rack 6 is shown pivotally mounted upon the rear ends of the side beams 4 of the chassis by means of suitable brackets 7. The trunk rack is adapted to be retained in operative and inoperative positions by means of hinged arms 8, connecting the rack 6 with an upright arm 9, here shown fixed to the chassis beam 4. When the luggage carrier is positioned upon the trunk rack 6, as indicated in dotted lines in Figure 1, and the walls thereof are unfolded, it may be used in much the same manner as an ordinary trunk. When not in use, it may be folded to the full line position shown in Figure 2 and the trunk rack folded upwardly against the rear end of the vehicle body as shown in Figure 1.

The novel luggage carrier featured in this invention preferably comprises a bottom member or wall 11, here shown having upright fixed wall portions 12 and 13 secured thereto. These wall portions may be integrally formed with the bottom 11 as shown in Figure 10.

Figures 3, 4, 5:
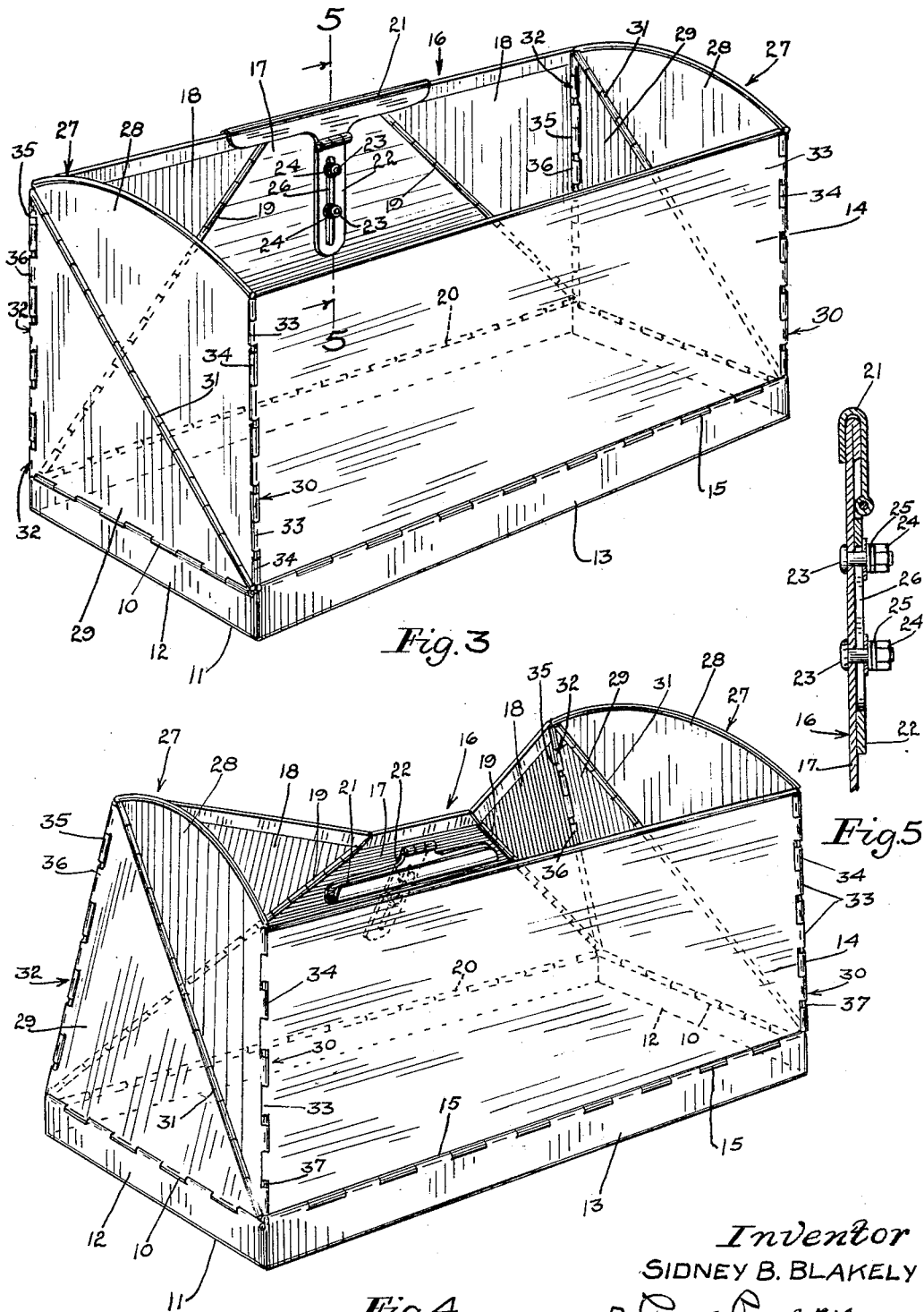
Figure 3 is a perspective view showing the luggage carrier set up or in unfolded operative position.
Figure 4 is a view showing the carrier partially folded.
Figure 5 is an enlarged detail sectional view on the line 5—5 of Figure 3, showing a means for retaining the back wall of the carrier in operative position.

A wall 14 which will hereinafter be referred to as the rear wall, is hinged to the rear fixed wall portion 13 by a suitable hinge 15, preferably extending the full length of the carrier as indicated in Figures 3 and 4. The front wall 16 of the carrier comprises three sections, an intermediate section 17 and the end sections 18. The opposite edges of the intermediate section 17 are inclined inwardly, as shown in Figure 3, and the end sections 18 are each provided with a correspondingly shaped edge adapted to be hinged to one of the inclined edges of the intermediate section 17 by suitable hinges 19. The hinges 19 extend from the lower forward corners of the box inwardly so that when the front wall 16 is folded inwardly over the bottom 11, the end sections 18 will fold upon the intermediate section 17, as will be clearly understood by reference to Figure 6.

A means for retaining the rear wall in unfolded operative position is shown in Figures 3 and 5, and consists of an elongated member 21 of U-shaped cross-section adapted to be engaged with the upper alined edges of the intermediate section 17 and the end sections 18, as best shown in Figure 3. The member 21 is hinged to a bar 22 slidably retained upon the intermediate section 17 by means of bolts 23 mounted in suitable apertures provided in the section 17. Each bolt 23 has a nut 24 received in threaded engagement therewith, and a suitable spring washer 25 is provided beneath each nut 24 to frictionally retain the bar 22 in an adjusted position. The bar 22 has an elongated slot 26 through which the bolts 23 pass as shown in Figure 5. When the member 21 is in the position shown in Figures 3 and 5, the front wall 16 of the carrier cannot be folded inwardly because of the locking effect of the member 21. When the carrier is to be folded, the member 21 is moved upwardly out of locking engagement with the upper edges of the front wall section 17, by simply sliding the plate 22 upwardly upon the screws 23, whereby the member 21 may be swung inwardly into the carrier to the position shown in Figure 4, and thus permit the front wall 16 to be folded inwardly as shown in this same figure.

The sides of the carrier are defined by walls 27 each comprising an upper section 28 and a lower section 29. The sections 28 and 29 of each side wall are connected together by a suitable hinge 31 extending from the lower rear corner of the carrier to the upper forward corner thereof, as shown in Figures 3 and 4. The upper sections 28 of the side walls are each connected to the rear wall 14 by suitable hinges 30 and, in like manner, the lower sections 29 of each side wall are connected by suitable hinges 32 to the end sections 18 of the front wall 16. The lower end sections 29 are also hinged to the upright wall portions 12 of the carrier bottom by hinges 10. The angularly disposed hinges 19 and 31 are arranged at an angle of approximately 45°, to facilitate holding.

Another feature of the invention resides in the location and arrangement of the hinges connecting the front, rear, and side walls to the upright fixed wall portions 12 and 13 of the bottom. In order that the walls, when in inoperative folded position, will lie in substantially parallel relation with respect to one another, the hinges connecting the foldable walls to the upright wall portions of the bottom, are situated on different levels, thereby assuring that the walls will fold inwardly upon one another without interference and in parallel relation. Referring to Figure 7, it will be noted that the hinge 15 at the rear of the carrier is located slightly above the hinges 10 at the sides of the carrier, and also that the hinge 20 at the front of the carrier is located slightly below the hinges 10. By thus arranging the hinges 15—10—20, the carrier walls, when folded, will lie in parallel relation with respect to one another as clearly shown in Figure 10.

Another feature of this invention resides in the construction of the corner hinges 30 and 32, which are so arranged that a relative sliding action takes place of the wall sections connected by these hinges, when the walls are folded to the positions shown in Figure 10. This sliding action results because the hinges 15—10 and 20 are located on different levels, which is necessary in order that the walls may fold to the parallel positions shown in Figure 10. In Figures 4 and 8, it will be noted that the loops 33 provided on the rear wall 14, have their upper ends substantially engaged with the lower ends of the corresponding loops 34 provided on the side wall sections 28. In like manner, the upper ends of the loops 35 provided at the ends of the front wall sections 18, are engaged with the bottom ends of the corresponding loops 36 provided upon the end wall sections 29.

When the carrier walls are folded inwardly from the position shown in Figure 3 to that shown in Figures 4 and 6, the loops 34 on the side wall sections 28, and the similar loops 36 on the side wall sections 29 will slide upwardly on the hinge rods 37, as indicated in Figure 7, wherein it will be noted that the loops 33 of the rear wall 14 are positioned substantially mid-way between the loops 34 provided upon the side wall sections 28. When the carrier walls are completely folded, as shown in Figures 9 and 10, the lower ends of the loops 33 of the rear wall 14 will substantially engage the upper ends of the loops 34 of the side wall sections 28. By thus permitting a sliding action to take place in the corner hinges 30 and 32 of the carrier, the hinges 15—10 and 20 may be located as hereinbefore described, thus assuring that the carrier walls will fold to the parallel positions shown in Figures 9 and 10.

To retain the carrier walls in the folded positions shown in Figures 9 and 10, a suitable hook member 38 may be secured to the front wall portion 13 of the bottom panel 11, and having its upper end adapted to engage the upper edge of the rear wall panel 14 as shown.

In the drawings, I have shown this novel luggage carrier supported upon the usual trunk rack 6 of an automobile, but it is to be understood that it may be mounted or supported upon the automobile in any manner desired as, for example, upon the usual running board thereof.

I claim as my invention:

1. A collapsible luggage carrier including a bottom member and a plurality of walls, hinges connecting said walls to the bottom member, said hinges being situated at different elevations whereby the walls may be folded inwardly, one over another in parallel relation, three of said walls each comprising a plurality of hinged-together sections whereby said sectional walls may fold upon themselves, when the carrier is collapsed, and means slidably and pivotally connecting together the walls at the corners of the carrier whereby said walls may slide relatively to each other at the corners of the carrier, when said walls are folded and unfolded.

2. A collapsible luggage carrier comprising a bottom member and a plurality of walls, hinges connecting said walls to said bottom member, said hinges being situated at different elevations to permit the walls to be folded inwardly, one over another in parallel relation, certain of said walls comprising a plurality of hinged-together sections whereby said walls may be folded upon themselves, means slidably and pivotally connecting together said walls at the corners of the carrier whereby said walls may slide relatively to each other at the corners of the carrier, when said walls are folded inwardly, one over another, and means for securing the walls in unfolded, operative positions.

3. In a collapsible luggage carrier comprising a bottom member, a pair of longitudinally extending walls, and suitable end walls, hinges connecting all of said walls to said bottom member, said hinges being situated at different elevations whereby the walls may be folded inwardly, one over another, said end walls and one of said longitudinally disposed walls each comprising a plurality of hinged-together sections whereby said walls may fold upon themselves, when the carrier is collapsed, and hinges slidably connecting together said walls at the corners of the carrier and permitting relative sliding movement of said walls at the corners of the carrier in directions lengthwise of said hinges, when the walls are folded and unfolded.

4. In a collapsible luggage carrier comprising a bottom member bounded by fixed upstanding marginal wall portions, longitudinally disposed walls hinged to the marginal wall portions at opposite sides of the carrier, end walls hinged to the marginal wall portions at the ends of the carrier, certain of said walls being provided with means whereby they may fold upon themselves, when the carrier is collapsed, and hinge means at the corners of the carrier for slidably and pivotally connecting together all of said walls and whereby the adjacent ends of pivotally connected walls may move relatively to one another in directions lengthwise of said corner hinges, when said walls are folded and unfolded, and the hinges connecting said walls to said marginal wall portions being situated at different elevations to permit said walls to be folded inwardly, one over another, in substantially parallel relation.

In witness whereof, I have hereunto set my hand this 4th day of December 1929.

SIDNEY B. BLAKELY.